Sept. 29, 1931.　　　A. J. CAWLEY　　　1,825,441
SOUND RECORDING PROCESS AND APPARATUS
Filed Jan. 8, 1921
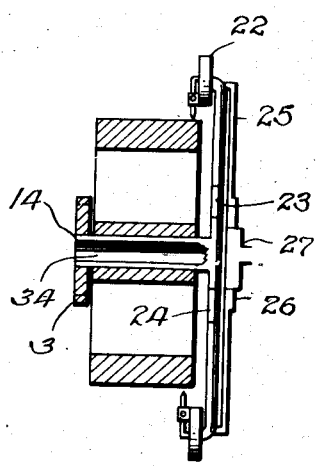
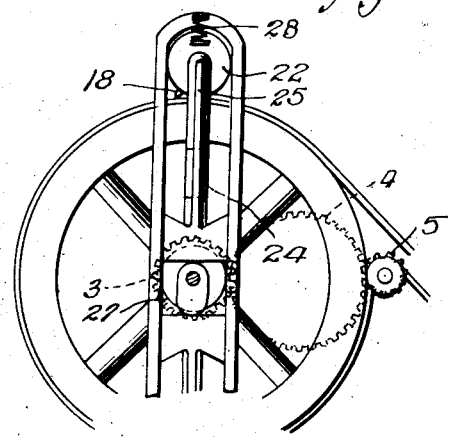
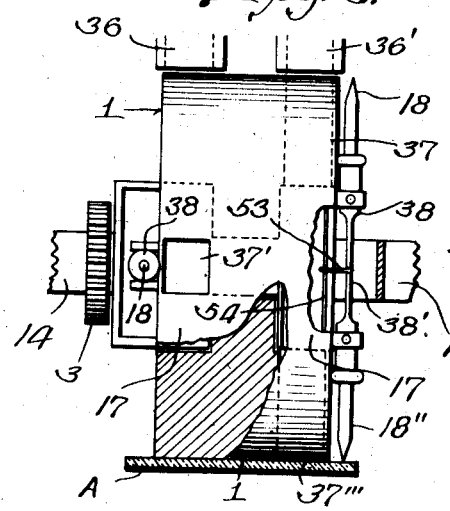
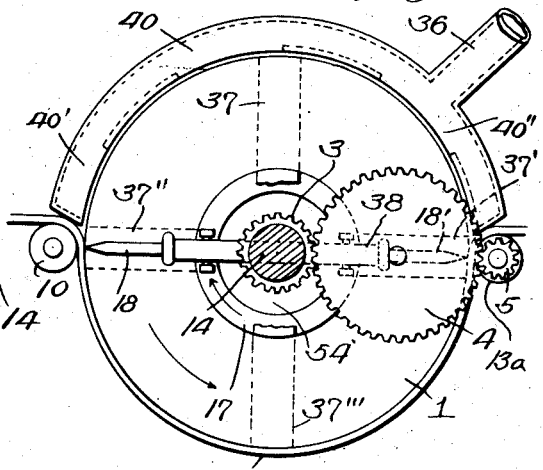
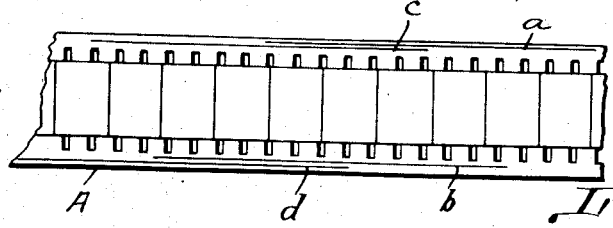
Inventor:
ALOYSIUS J. CAWLEY
by H. S. Grover
ATTORNEY Patented Sept. 29, 1931

1,825,441

UNITED STATES PATENT OFFICE

ALOYSIUS J. CAWLEY, OF PITTSTON, PENNSYLVANIA, ASSIGNOR TO RADIO CORPORATION OF AMERICA, OF NEW YORK, N. Y., A CORPORATION OF DELAWARE

SOUND RECORDING PROCESS AND APPARATUS

Application filed January 3, 1921. Serial No. 435,984.

The invention relates generally to the method of producing sound records on motion picture films, so that sound and picture records may be synchronously reproduced, although it is not necessarily limited to this field.

More particularly, the invention is concerned with the recording of sound on a film at a recording speed that is much in excess of the speed of the film. An arrangement is provided whereby a recorder is in contact with a film while moving in the opposite direction thereto. The recording speed is thus equal to the sum of the speeds of the recorder and film.

A plurality of recorders are employed. These make contact alternately with separate portions of the film. The recorders are placed radially at fixed intervals and one makes contact with a record surface of a given length, while the film has passed through but a fraction of this length. The other recorder is then in a position to make contact with an equivalent length juxtaposed thereto, or opposite to, that traversed by the first.

Arrangements are described whereby any desired sound recording speed may be obtained without any increase in the speed of the film by simply increasing the number and speed of the recording units.

The invention is perfectly adaptable to the standard motion picture film as it exists in practice at present, and is concerned with placing sound records on the margin or margins of such a film. The records are obviously of an intermittent character. This is readily feasible, particularly if mechanical sound grooves are used, as there is room for a very large number of such records on such margins. The records may be placed on one margin only, or may be distributed on both margins, as hereinafter described.

As the sound records are intended to be placed on the margins of the film, there is no interference of picture and sound record as would be the case, if for instance, the latter were placed across the reverse face of the film, as in such case, they would be projected upon the picture screen.

It will be noted that there are no abrupt changes in the direction of the moving parts. All parts move in a uniform manner, and the apparatus as a whole is very simple. It is to be especially noted that, although the recording speed is rather high, neither the film carrier nor the recorders move at this speed, the high speed mentioned being due to the relative motion of recorder and film. This means that considerable wear is saved in the apparatus.

One can readily see that by employing a suitable number of recorders moving at a proper speed, that photographic sound recording processes requiring a speed of six feet per second may be utilized so that they may be placed on a film that is moving at the standard motion picture speed of one foot per second.

For a more complete understanding of the invention reference is to be had to the following description and claims taken in connection with the accompanying drawings, in which like characters of reference denote corresponding parts in all the views, and in which, Figure 1 is a plan view of a device employing mechanical recording whereby the non-functioning recorder is raised from the film surface at the proper time.

Figure 2 is a side view of the mechanical recording arrangement shown in Figure 1.

Figure 3 is an elevational view, partly in cross-section, of another embodiment of the invention. This consists of two concentrically revolving sound recorders adapted to coact with circumferential valves.

Figure 4 is a side elevational view of the device shown in Figure 3.

Figure 5 is a plan view of a motion picture film having a plurality of high speed sound record grooves on its margin.

If it is desired to record or reproduce without the use of electricity, recourse may be had to the device illustrated in Figures 1 and 2. Here the film is wound upon the revolving film carrier 1. The shaft 14 is made hollow. The recorders 22 connect with the hollow shaft by means of the hollow radial members 23, having the flexible element 24, which may be either a section of rubber tubing or the like; this is designed to permit the recorders 22 to be lifted in turn from the surface of the film, by operation of the connections 25 provided with the shoes 26 which coact with the stationary cam 27. The cam is stationary, while the arms revolve. Gear wheel 3 is attached to the shaft 14, which is provided with the passage 34. External connection is made by means of a swivel or other flexible joint, which permits turning, but is sufficiently sound tight. The action of the spring 28 holds the shoes 26 in firm contact with the cam 27. Wheel 13a moves the film and toothed gear wheel 3, while 4 and 5 move the radial members in the opposite direction as in Figure 4. It is to be understood that actual contact with the film is only made through part of the circumference of film carrier 1, namely the left half shown in Figure 2. The radial member lifts the recorder 22 completely away from the film surface when it reaches the right half of the circumference. This post is however, not necessary, as the film at that point has been raised from the surface of wheel 1. Wheel 1 is no longer beneath it, consequently it may be freely bent downwards by the recorder as the latter passes forwards. The radial member is shown at 25 in Figure 1. No trouble is occasioned by the ravelling and unravelling of the film at the point where it leaves or arrives at the rotating member. The exact contour of the cam is not implied in the drawing, as it may be made in many forms other than that shown at 27.

By making the rotating film carrier 1 of very large diameter, the styli would remain in contact with the film for a much longer period. Also the possibility of the commutation of the different reproducers being audibly detected by the audience would be minimized.

A type of sound recording employing centrally located sound boxes and circumferential valves is described in Figures 3 and 4. Figure 3 is a view of a device in which two concentrically revolving sound recorders are provided with two styli each, the latter being attached by means of bars 38 and 38', that possess greater flexibility towards their centers in one plane only, while being perfectly rigid in a plane that is at right angles to this. The stylus bars carrying the styli 18 and 18' do not vibrate in the plane of their circular motion, but may be readily vibrated in a plane at right angles to this, due to the stylus bar being flattened or thinned in the plane of motion of the bar. As shown in the drawings the stylus bars 38' are at right angles to each other; this, however may be varied. The valves in the apparatus are shown at the surface of member 1; several may be arranged circumferentially so that only one recorder is connected to the external circuit at a time. All reference numerals have the same meaning as heretofore, and in addition, 36 and 36' represent two of the radial valves. 37, 37' are passages through 1 connecting the recorders with the valves at the proper time. The special stylus bars are shown at 38 and 38'. These may also be jointed, if desired. The diaphragm 54 is connected to the stylus bar 38' by link 53.

The styli and film carrier move in opposite directions as before described, the commutation being made by means of the radial valves 36 and 36', which are movable over the surface in order that they can be disposed so as to permit but one recorder to record or reproduce its own record.

In Figure 4, which is a view of the left side of Figure 3, it will be noticed that passage 37' is just ceasing to give the record from its sound box, while 37 has just started to give its record. The opposite ends of the passages have been closed by film A. Passage 37 is communicating with opening 40, which extends for a distance of one-twelfth of the circumference of wheel 1; therefore, its corresponding stylus 18" (Figure 3) is about to sweep from 37"', in the lower part of the circle, to wheel 10 during the same time that passage 37 traverses the opening 40. Although stylus 18' in the right horizontal position will pass from wheel 13a to 37"' during the same period, its sound will not be heard because passage 37" will not reach the valve opening 40" in the upper right quadrant of the circle until stylus 18' has reached the position of 37"' in the lower semicircle. It will thus be seen that the arc extending from the point 37"' in the lower semicircle to wheel 10 is the portion of the film where the sound is recorded or reproduced, the film passing through one-third of this arc, while the stylus passes over its entire length in the opposite direction. The sum of the speeds is four times film speed. If desired, the wheel 13a may be placed at 37, but in such case the arc between those two points should be covered by the surface of the valve, as shown in the upper semicircle between the valve openings. This is to prevent the escape of sound to the external air. It will be noticed that film A covers one end of passages 37', 37" and 37"', while the passage 37 communicates with the openings in the valves, such as 40. Also, since the film is held perfectly tight by means of wheels 10 and 13a, it will act as a spring to hold the stylus and film in contact, and it may be unnecessary to provide springs, or the like on arms 38, etc., to hold the two in contact. There is no objection to the overlapping of records, as it only means that the two records reproduce the same sounds in synchronism for a short interval.

In fact, this may be very desirable, as then it would compensate for the partial opening produced as at 37 communicating with 40. In this way, the two passages, such as 37 and 37' in Figure 4 would reproduce in synchronism until 37 had achieved a full, open communication with 40, at which time 37' would be completely cut off from its corresponding opening 40'. There will thus be a fusing together of the separate records, which will act to disguise the disconnected character of those elements and give the illusion of a single continuous record. Obviously there will always be the same area of sound passage communicating with the valve openings; when one is three quarters open, the other is one-quarter open, and so on. When one attains its full opening, the other is closed. One goes from zero to maximum during the same time that the other goes from maximum to zero. This feature will occupy the same position in fusing the separate elements into one as the persistence of vision of the optic nerve occupies in fusing the separate pictures of a motion picture film.

As shown in Fig. 3, the styli in this construction for producing a quadruple sound record are spaced at different distances from the edge of the cylinder so as to secure the desired or necessary separation of the grooves on the margin of the film.

The line $a$ represents the record impressed by one stylus, and $b$, $c$, and $d$ that impressed by the others during one revolution of stylus 18. Obviously, the stylus corresponding to groove $a$ has again arrived at the end of its groove, and is ready to further extend it to the left. The other styli will in turn do likewise. On a complete film, therefore, there will be four continuous, parallel grooves through its length. Though a number of grooves may be used, still, emphasis is placed on two, giving a recording speed of two feet per second.

By varying the relative diameters of wheels 3, 4 and 5, any desired recording speed may be obtained, while film speed remains normal. The invention includes all such possible adjustments; moreover, it is not limited to any particular arc of contact between film and stylus; it may be a semi-circle.

As the invention is very flexible in principle, it is not limited to any of the combinations or arrangements which are available for selection.

Each recorder contacts with the precise portion of the film as regards right or left throughout the length of the film. As the latter is held rigidly in position, the proper sound reproducer finds its corresponding groove with absolute precision.

Laterally undulating sound recording has been very successful commercially, and as there is room for many such record grooves on the margin of a moving picture film, the invention offers a means of placing several such records there, and utilizing them to reproduce sounds. Moreover, by this means a recording speed is available that is in excess of that used in commercial sound recording.

It will be apparent to those skilled in the art that many of the elements herein described, or referred to, are applicable to other species of sound recording or reproducing apparatus or are of general utility in the art, such subject-matter being more specifically claimed in my divisional applications, Serial Nos. 393,071, 393,072 and 393,073 all filed September 16, 1929.

By the term "longitudinally magnified", hereinafter, I refer to a sound record whose longitudinal extent relative to its carrying medium has been increased beyond the extent normally occupied by a record of the same sound.

Having thus described my invention, I claim as new and desire to secure by Letters Patent,

1. The process of sound recording and reproducing, consisting in moving a film and styli in opposite directions, to obtain a recording speed that is greater than film speed, and permitting but one stylus to function at a time.

2. A combination, consisting of means for moving a film and contacting styli in opposite directions, to obtain a speed of recording which is greater than film speed, and means for permitting but one recorder to function at a time.

3. A combination consisting of a film carrier and radial arms bearing recorders; means for moving the film carrier and recorders in opposite directions, to obtain a recording speed greater than film speed; and means for lifting a non-functioning recorder from the film surface.

4. A combination consisting of a film carrier and radial members bearing recorders rigidly connected to a hollow shaft to support said members; means for moving the film carrier and recorders in opposite directions, to obtain a recording speed that is greater than film speed; and means for mechanically lifting a non-functioning recorder from the film surface.

5. A combination consisting of a film carrier and radial arms carrying sound tubes and recorders which function alternately, and a hollow shaft to form a sound passage and support said arms; means for moving the film carrier and recorders in opposite directions, to obtain a recording speed that is greater than film speed; and mechanical means for lifting a non-functioning recorder from the film surface.

6. A combination consisting of a film carrier and radial arms carrying sound tubes and recorders which alternately function, and a hollow shaft to form a sound passage and rotate said arms; mechanical means for lifting a non-functioning recorder from the film surface; shoes and rods, stationary cams operating said shoes and rods; gearing for moving the film carrier and recorders in opposite directions to obtain a recording speed greater than film speed.

7. A combination consisting of a large wheel freely rotating on a hollow shaft having a film wound around its periphery, two hollow radial members rigidly attached to said hollow shaft and bearing sound recorders which contact alternately with said film, said hollow shaft and hollow radial members forming a sound passage from said recorders to external air; a gear wheel rigidly mounted on said shaft, a wheel coacting with said film, gear wheels coacting with said first gear wheel and said sprocket to cause said recorders and said film to move in opposite directions while in alternate contact with each other; mechanical means such as shoes and cams to alternately lift one of said recorders from said film.

8. A combination consisting of a hollow shaft rigidly attached to two rotatable, hollow, radial arms bearing sound recorders, said hollow shaft and hollow arms acting to convey sound vibrations to said sound recorders, said arms being provided with a flexible link to render said arms extensible; means consisting of rods, shoes and cams for lifting one recorder alternately; a wheel engaging with a film, a gear wheel rigidly attached to said shaft, gear wheels engaging therewith to convey motion in the opposite direction to said sprocket wheel engaging with said film; a large wheel mounted loosely on said shaft and having said film wound around its periphery, said recorders making contact alternately with said film while both said film and said recorders are moved in opposite directions.

9. A combination consisting of a hollow shaft attached to two extensible hollow radial arms bearing sound recorders, said shaft and arms constituting a sound wave conveying means to said recorders; means for alternately extending said radial arms; a wheel loosely though accurately mounted on said shaft and bearing a film on its periphery; a gear wheel rigidly attached to said shaft and engaging with means for moving said film in a direction opposite to said wheel.

10. A combination consisting of a shaft carrying radial members bearing sound recorders, a gear wheel attached to said shaft; a cam on said shaft coacting with rods and shoes on said radial members to alternately extend one of said radial members; a wheel mounted but not attached to said shaft, a film engaging with the periphery of said wheel and moving therewith; a gear wheel mounted upon said shaft and gear wheels engaging therewith and coacting with said film in order to move said recorders and film in opposite directions.

11. A moving picture film bearing a number of longitudinal discontinuous complementary synchronized sound records each being longitudinally magnified in the same ratio as the number of records.

12. A combination including a film carrier consisting of a large wheel and radial arms bearing recorders; means for moving the film carrier and recorders in opposite directions, to obtain a recording speed greater than film speed; and means for lifting a non-functioning recorder from the film surface.

ALOYSIUS J. CAWLEY.